US010251337B2

(12) United States Patent
Conrad (10) Patent No.: US 10,251,337 B2
(45) Date of Patent: Apr. 9, 2019

(54) APPARATUS AND METHOD FOR MINIMIZING THE VOLUME OF A LIQUID CARRIER USED FOR DELIVERING AGRICULTURAL PRODUCTS IN

(56) References Cited

U.S. PATENT DOCUMENTS

| | | |
|---|---|---|
| 861,355 A | 7/1907 | Brower |
| 868,300 A | 10/1907 | Sohner et al. |
| 924,099 A | 6/1909 | Nelson |
| 931,882 A | 8/1909 | Martin |
| 2,794,407 A | 6/1957 | Wist et al. |
| 4,009,668 A | 3/1977 | Brass et al. |
| 4,497,265 A | 2/1985 | Hood et al. |
| 4,521,908 A | 6/1985 | Miyaji et al. |
| 4,522,340 A | 6/1985 | Gandrud |
| 4,529,073 A | 7/1985 | Lewis |
| 4,570,858 A * | 2/1986 | Bintner ............... B05B 15/00 239/390 |
| 4,611,606 A | 9/1986 | Hall et al. |
| 4,691,645 A | 9/1987 | Anderson |
| 4,705,220 A | 11/1987 | Gandrud et al. |
| 4,896,615 A | 1/1990 | Hood, Jr. et al. |
| 4,917,304 A | 4/1990 | Mazzei et al. |
| 4,971,255 A | 11/1990 | Conrad |
| 5,024,173 A | 6/1991 | Deckler |
| 5,029,624 A | 7/1991 | McCunn et al. |
| 5,060,701 A | 10/1991 | McCunn et al. |
| 5,125,438 A | 6/1992 | McCunn et al. |
| 5,220,876 A | 6/1993 | Monson et al. |
| 5,224,577 A | 7/1993 | Falck et al. |
| 5,301,848 A | 4/1994 | Conrad et al. |
| 5,379,812 A | 1/1995 | McCunn et al. |
| 5,524,794 A | 6/1996 | Benedetti, Jr. et al. |
| 5,539,669 A | 7/1996 | Goeckner et al. |
| 5,638,285 A | 6/1997 | Newton |
| 5,641,011 A | 6/1997 | Benedetti, Jr. et al. |
| 5,687,782 A | 11/1997 | Cleveland et al. |
| 5,737,221 A | 4/1998 | Newton |
| 5,931,882 A | 8/1999 | Fick et al. |
| 6,122,581 A | 9/2000 | McQuinn |
| 6,198,986 B1 | 3/2001 | McQuinn |
| 6,748,884 B1 | 6/2004 | Bettin et al. |
| 6,763,773 B2 | 7/2004 | Shaffert et al. |
| 6,938,564 B2 | 9/2005 | Conrad et al. |
| 7,171,912 B2 | 2/2007 | Fraisse et al. |
| 7,171,913 B1 | 2/2007 | Conrad |
| 7,270,065 B2 | 9/2007 | Conrad |
| 7,317,988 B2 | 1/2008 | Johnson |
| 7,380,733 B2 | 6/2008 | Owenby et al. |
| 7,694,638 B1 | 4/2010 | Riewerts et al. |
| 7,916,022 B2 | 3/2011 | Wilcox et al. |
| 8,024,074 B2 | 9/2011 | Stelford et al. |
| 8,141,504 B2 | 3/2012 | Dean et al. |
| 8,322,293 B2 | 12/2012 | Wollenhaupt et al. |
| 8,336,470 B2 | 12/2012 | Rans |
| 8,371,239 B2 | 2/2013 | Rans et al. |
| 8,371,240 B2 | 2/2013 | Wollenhaupt et al. |
| 8,504,234 B2 | 8/2013 | Anderson |
| 8,504,310 B2 | 8/2013 | Landphair et al. |
| 8,517,230 B2 | 8/2013 | Memory |
| 8,600,629 B2 | 12/2013 | Zielke |
| 8,781,693 B2 | 7/2014 | Woodcock |
| 8,825,263 B1 | 9/2014 | Nelson, Jr. |
| 8,868,300 B2 | 10/2014 | Kocer et al. |
| 8,924,099 B2 | 12/2014 | Nelson, Jr. |
| 9,113,591 B2 | 8/2015 | Shivak |
| 2003/0226484 A1 | 12/2003 | O'neall et al. |
| 2004/0231575 A1 | 11/2004 | Wilkerson et al. |
| 2007/0193483 A1 | 8/2007 | Conrad |
| 2007/0266917 A1 | 11/2007 | Riewerts et al. |
| 2010/0101466 A1 | 4/2010 | Riewerts et al. |
| 2010/0282141 A1 | 11/2010 | Wollenhaupt et al. |
| 2010/0282143 A1 | 11/2010 | Preheim et al. |
| 2010/0282144 A1 | 11/2010 | Rans et al. |
| 2010/0282147 A1 | 11/2010 | Wollenhaupt et al. |
| 2011/0035055 A1 | 2/2011 | Applegate et al. |
| 2011/0054743 A1 | 3/2011 | Kocer et al. |
| 2011/0296750 A1 * | 12/2011 | Davis ............... A01M 7/0046 47/1.7 |
| 2012/0010789 A1 | 1/2012 | Dulnigg |
| 2012/0042815 A1 | 2/2012 | Wonderlich |
| 2013/0061789 A1 | 3/2013 | Binsirawanich et al. |
| 2013/0061790 A1 | 3/2013 | Binsirawanich et al. |
| 2013/0085598 A1 | 4/2013 | Kowalchuk |
| 2013/0152835 A1 | 6/2013 | Stevenson et al. |
| 2013/0192503 A1 | 8/2013 | Henry et al. |
| 2014/0026792 A1 | 1/2014 | Bassett |
| 2014/0183182 A1 | 7/2014 | Oh et al. |
| 2014/0252111 A1 | 9/2014 | Michael et al. |
| 2014/0263705 A1 | 9/2014 | Michael et al. |
| 2014/0263708 A1 | 9/2014 | Thompson et al. |
| 2014/0263709 A1 | 9/2014 | Kocer et al. |
| 2014/0277780 A1 | 9/2014 | Jensen et al. |
| 2014/0284400 A1 | 9/2014 | Hebbert et al. |
| 2015/0094916 A1 | 4/2015 | Bauerer et al. |
| 2015/0097707 A1 | 4/2015 | Nelson, Jr. et al. |
| 2015/0195988 A1 | 7/2015 | Radtke et al. |
| 2015/0334912 A1 | 11/2015 | Sauder et al. |
| 2018/0049367 A1 | 2/2018 | Garner et al. |

FOREIGN PATENT DOCUMENTS

| | | |
|---|---|---|
| WO | 2014018717 A1 | 1/2014 |
| WO | 2013191990 A3 | 2/2014 |
| WO | 2015061570 A1 | 4/2015 |

OTHER PUBLICATIONS

Screenshot from http://www.amvacsmartbox.com/Portals/0/Guides/DropTubes/Drop%20Tube%20-%20John%20Deer%20-%20Reart%20Mount.PD, downloaded on Jul. 13, 2017 (1 Page).

European Application No. EP-14 85 5768.9, European Extended Search Report and Written Opinion of the European Searching Authority dated May 10, 2017 Attached to Pursuant to Rule 62 EPC and Cited References (92 Pages).

* cited by examiner

ABUFETRA AFD METHOD FOR
MINIMIZING THE VOLUME OF A LIQUID
CARRIER USED FOR DELIVERING
AGRICULTURAL PRODUCTS INTO A
FURROW DURING PLANTING

CROSS REFERENCE TO RELATED APPLICATIONS

This patent application claims the benefit of U.S. application Ser. No. 15/190,652, filed Jun. 23, 2016, entitled APPARATUS AND METHOD FOR MINIMIZING THE VOLUME OF A LIQUID CARRIER USED FOR DELIVERING AGRICULTURAL PRODUCTS INTO A FURROW DURING PLANTING.

This patent application claims the benefit of U.S. Provisional Application No. 62/188,555, filed Jul. 3, 2015, entitled APPARATUS AND METHOD FOR MINIMIZING THE VOLUME OF A LIQUID CARRIER USED FOR DELIVERING AGRICULTURAL PRODUCTS INTO A FURROW DURING PLANTING.

BACKGROUND OF THE INVENTION

1. Field of the Invention

The present invention relates generally to material delivery systems for agricultural products, including fertilizers, nutrients, crop protection chemicals, biologicals, plant growth regulators; and, more particularly to material dispensing systems for dispensing agricultural liquid products at relatively low rates.

2. Description of the Related Art

Most agricultural liquid products applied at planting are applied generally using water as the carrier, but other carriers may be used such as liquid fertilizers, at rates of the carrier above two gallons per acre. Applying the agricultural liquid products in the carrier at rates below two gallons per acre causes metering problems with the row planter unit that dispenses these agricultural liquid products. One issue is that dispensing agricultural liquid products in a carrier at these low rates requires a relatively small orifice for metering with a standard liquid dispensing system. The small orifice results in concomitant issues with plugging and limits the products that maybe applied at these low rates. The small orifices become more easily plugged by contaminates and particulates if a low rate of dispensing is involved.

Using selective applicators to control weeds growing above the crop has been widely adopted as a weed control method. Several types have been developed. Among them are recirculating sprayers, roller applicators, carpet wipers, and rope wick applicators of several designs. A discussion of rope wick applicators is in the publication "Rope Wick Tips", by Dennis R. Gardisser, Cooperative Extension Service, University of Arkansas, U.S. Department of Agriculture, and County Government Cooperating, Publication MP229, undated. A rope wick applicator works the way the name suggests. The chemical is wicked from a reservoir to the exposed portion of the rope. This exposed portion of rope is then wiped against the plant to be controlled.

There are several systems used on typical agricultural sprayers that pulse the liquid at three to twenty times a second. This range of pulse rate provides a high degree of control of application. For a given nozzle size and/or application rate the range of speed of travel is more limited if one is not pulsing the application of the agricultural product than if one is pulsing the application. By applying the principals of the present invention, as will be disclosed below, the amount of carrier to apply the pesticides, etc. at planting, can be reduced. The amount of agricultural product can also be reduced.

In some embodiments of the present invention, the spray nozzle of the dispensing system of the row planter unit is modified, as will be disclosed below, to provide a continuous line of agricultural liquid products. In other embodiments, where, what is known in this field as a seed firmer or rebounder is used, features are provided to work with such a low rate of dispensing. Seed firmers and rebounders are used to better place the seed in the bottom of the seed furrow or trench.

SUMMARY OF THE INVENTION

In one aspect, the present invention is embodied as a method for minimizing the volume of a liquid carrier used for delivering an agricultural product into a furrow during planting. A spray nozzle is mounted on a planter row unit so as to dispense a carrier containing an agricultural product along a dispensing pattern in alignment with the pattern width of the spray nozzle, in the direction of the furrow.

In another aspect, the present invention is embodied as an apparatus for minimizing the volume of a liquid carrier used for delivering a carrier containing an agricultural product into a furrow during planting. The apparatus includes a seed tube assembly for dispensing seed. A seed cover assembly is operatively connected to the seed tube assembly. A seed cover application tube is mounted to the seed cover assembly. The seed cover application tube assembly has an outlet end for dispensing a carrier containing an agricultural product. A seed cover brush is mounted to the outlet end of the seed cover application tube. The seed cover brush is configured to contact the carrier containing the agricultural product during the dispensing thereof and brush the carrier containing the agricultural product onto the seed being dispensed from the seed tube assembly.

In another embodiment the apparatus for minimizing the volume of a liquid carrier used for delivering a carrier containing an agricultural product into a furrow during planting includes a seed firmer application tube assembly mounted to said seed firmer assembly. The seed firmer application tube assembly has an outlet end for dispensing a carrier containing an agricultural product.

The application rate range of the present invention provides for a convenient package for handling and shipping. The containers may be made smaller and lighter than presently used containers. Manufacturing and shipping costs are therefore reduced. Furthermore, there is less volume of agricultural product required, resulting in reduced storage and handling requirements.

In some embodiments the agricultural product containers are rigid. In some embodiments the agricultural product containers may be disposable.

BRIEF DESCRIPTION OF THE DRAWINGS

FIG. 1 illustrates an apparatus for minimizing the volume of a liquid carrier used for delivering an agricultural product into a furrow, from a planter row unit, during planting in accordance with the principles of the present invention, in which a spray nozzle is mounted so as to dispense an agricultural product along a dispensing pattern in alignment with the pattern width of the spray nozzle, in the direction of the furrow.

FIG. 2 is an enlarged perspective illustration of a portion of the planter row unit of FIG. 1, showing the orientation of the spray nozzle to dispense along a dispensing pattern in alignment with the pattern width, in the direction of the furrow.

be on the order of 3¼ to 5¾ inches. Ferule style brushes are manufactured by, for example, Felton Brushes. The bristles are preferably nylon.

The seed cover brush 32 can be secured to the seed cover assembly 30 by a bracket 50 and tab 52 with opening. The seed cover assembly 30 may be secured to the seed tube assembly 36 by ties 54.

Figure 1:
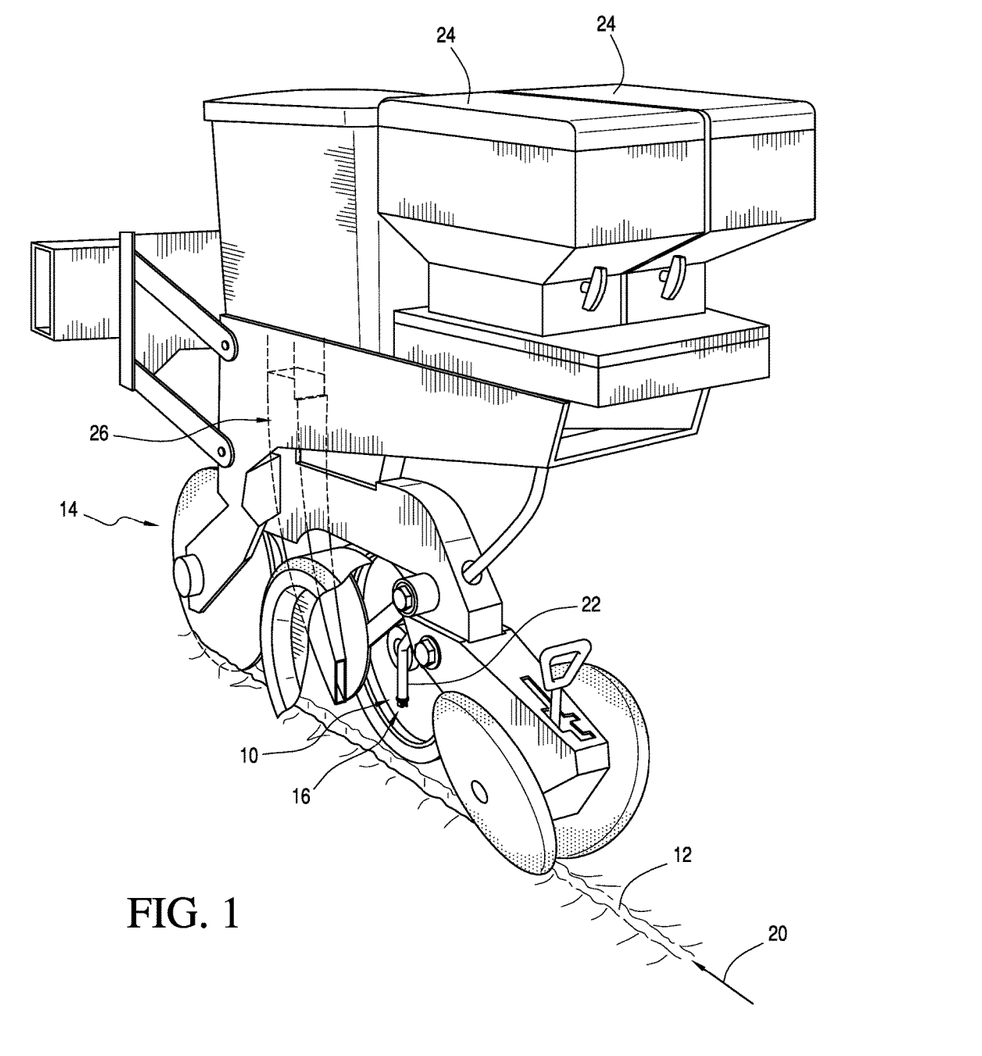
Figure 2:
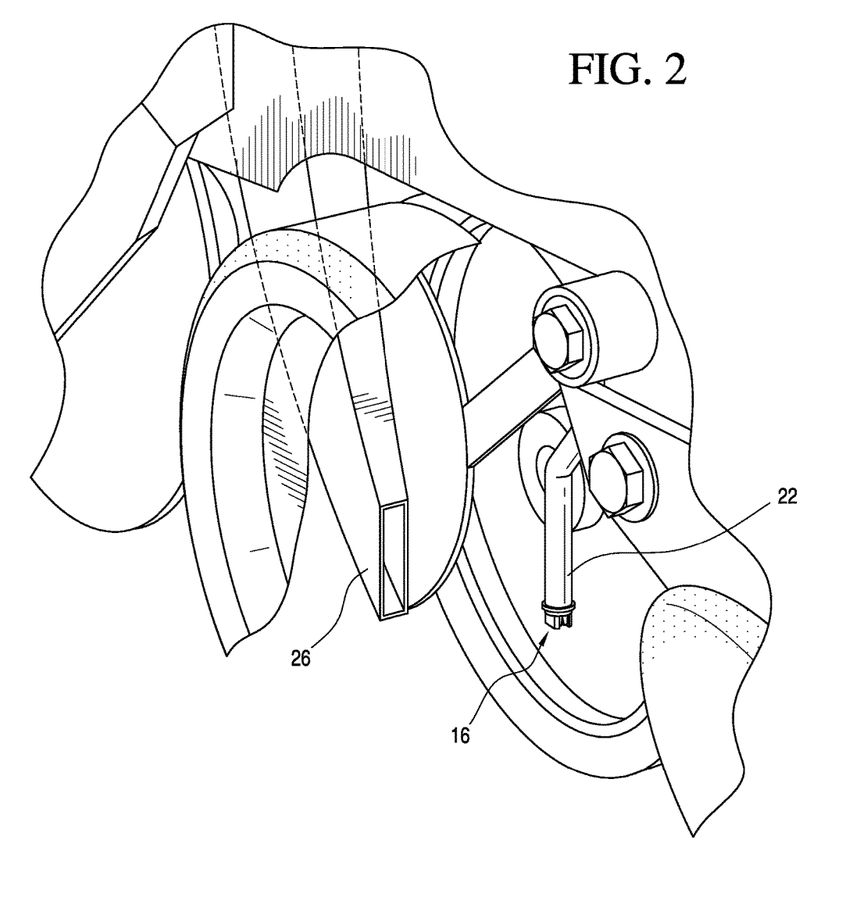
Figure 3:
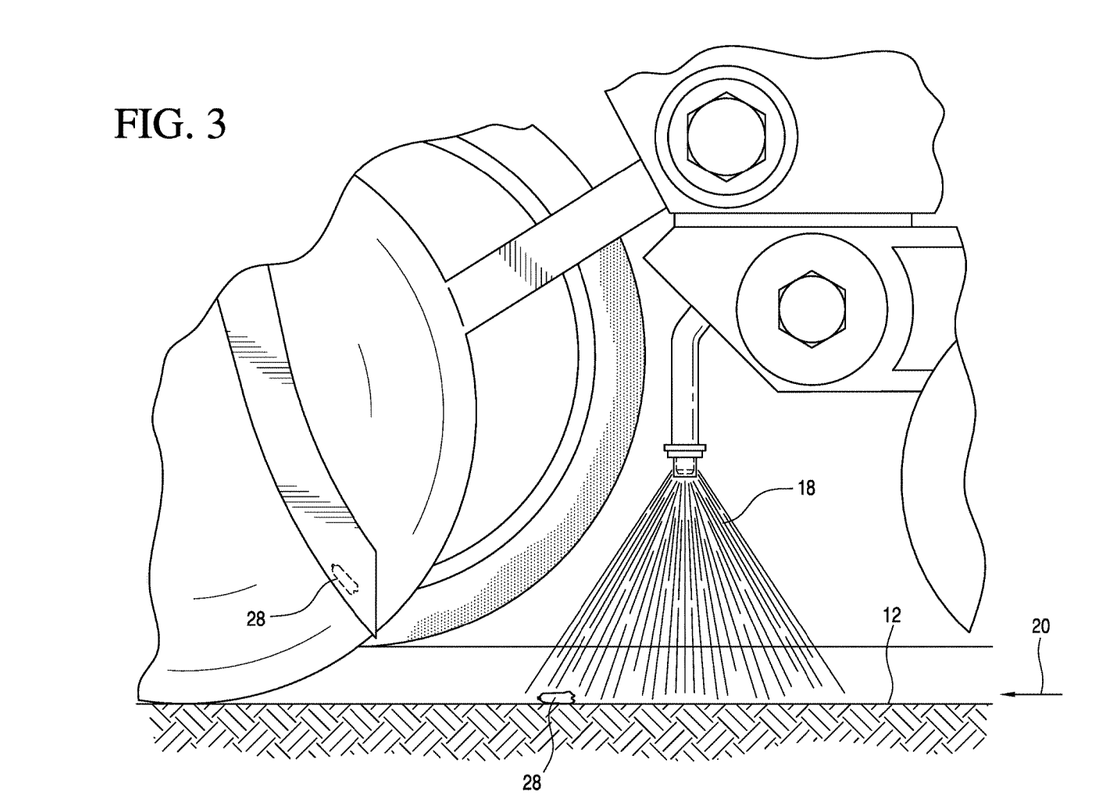
FIG. 3 is a schematic side view of the system shown in FIG. 1, in operation.
Figure 4:
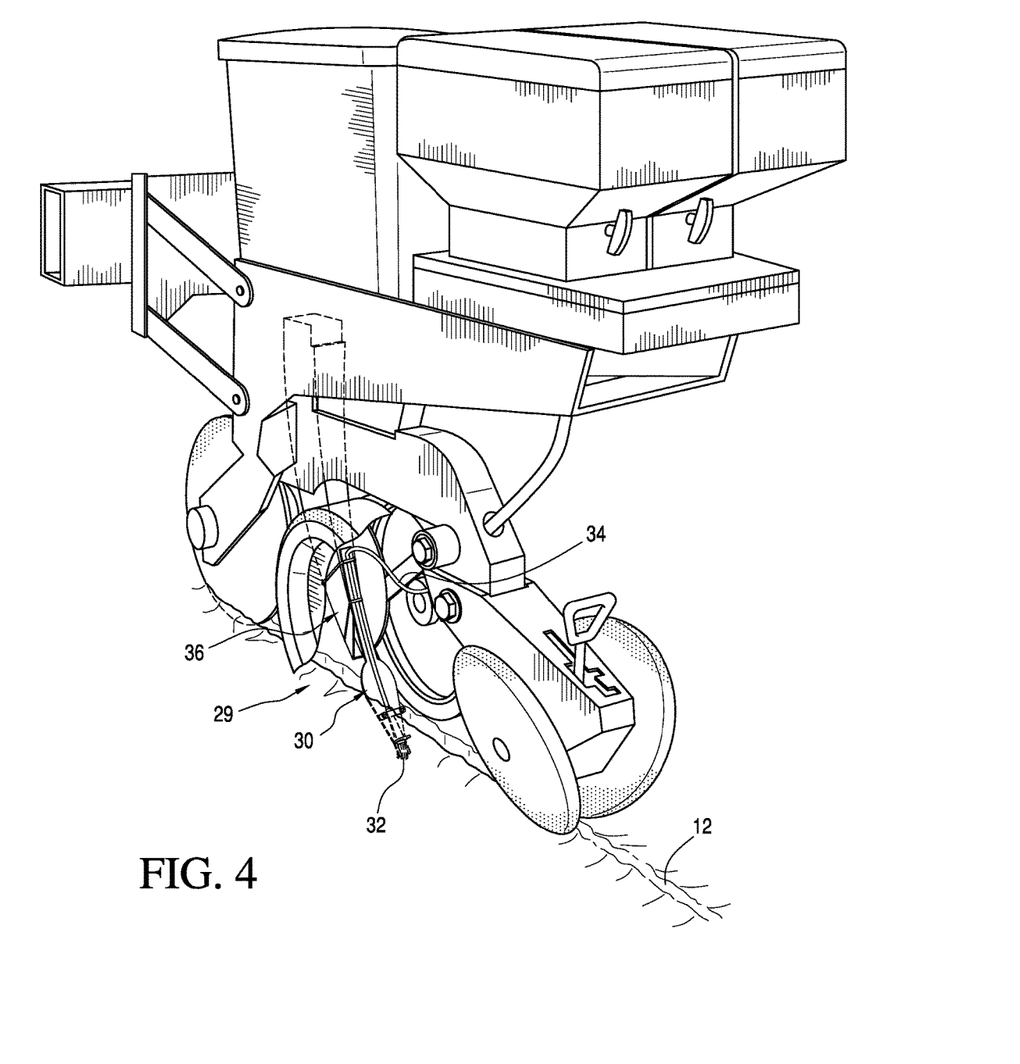
FIG. 4 illustrates a second embodiment of an apparatus for minimizing the volume of a liquid carrier used for delivering an agricultural product onto a seed in the furrow during planting, in which a seed cover assembly is used with a seed cover brush mounted to the outlet end of a seed cover application tube, the seed cover brush being configured to contact the agricultural product during the dispensing thereof and brushing the agricultural product onto the seed being dispensed from a seed tube assembly.
Figure 5:
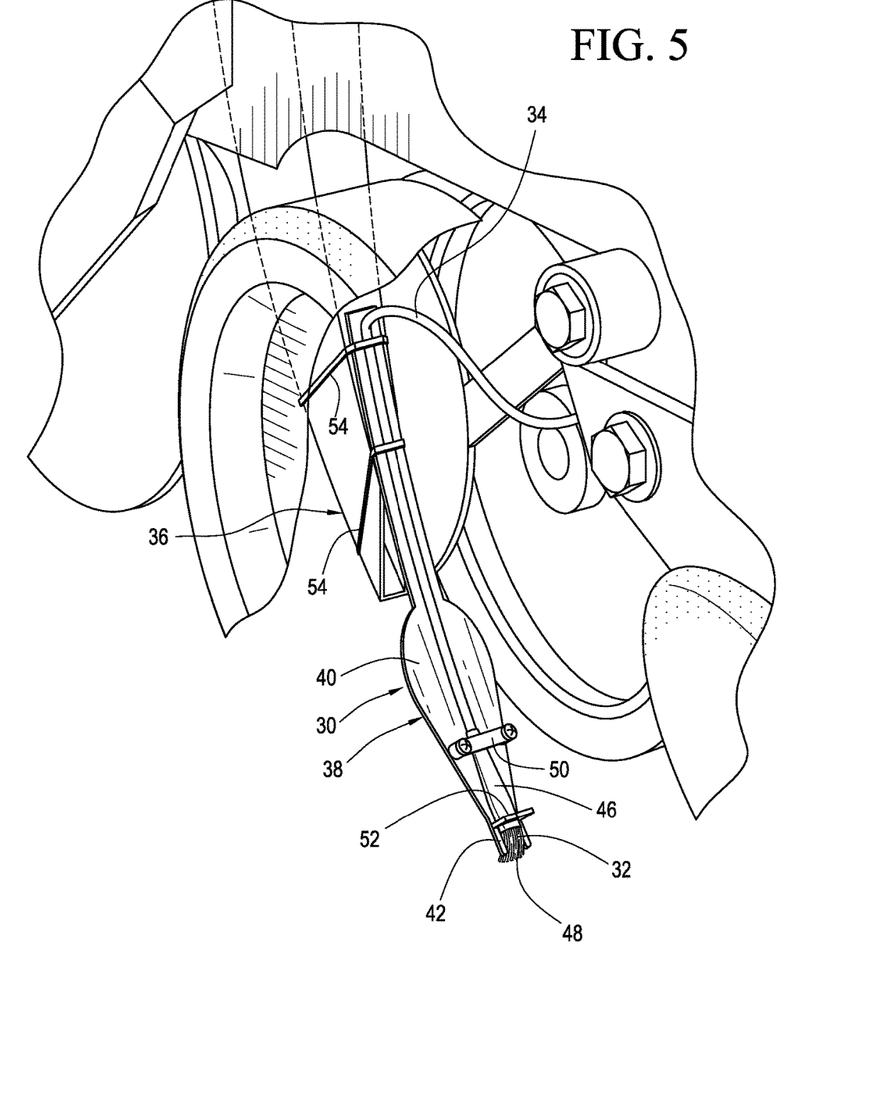
Figure 6:
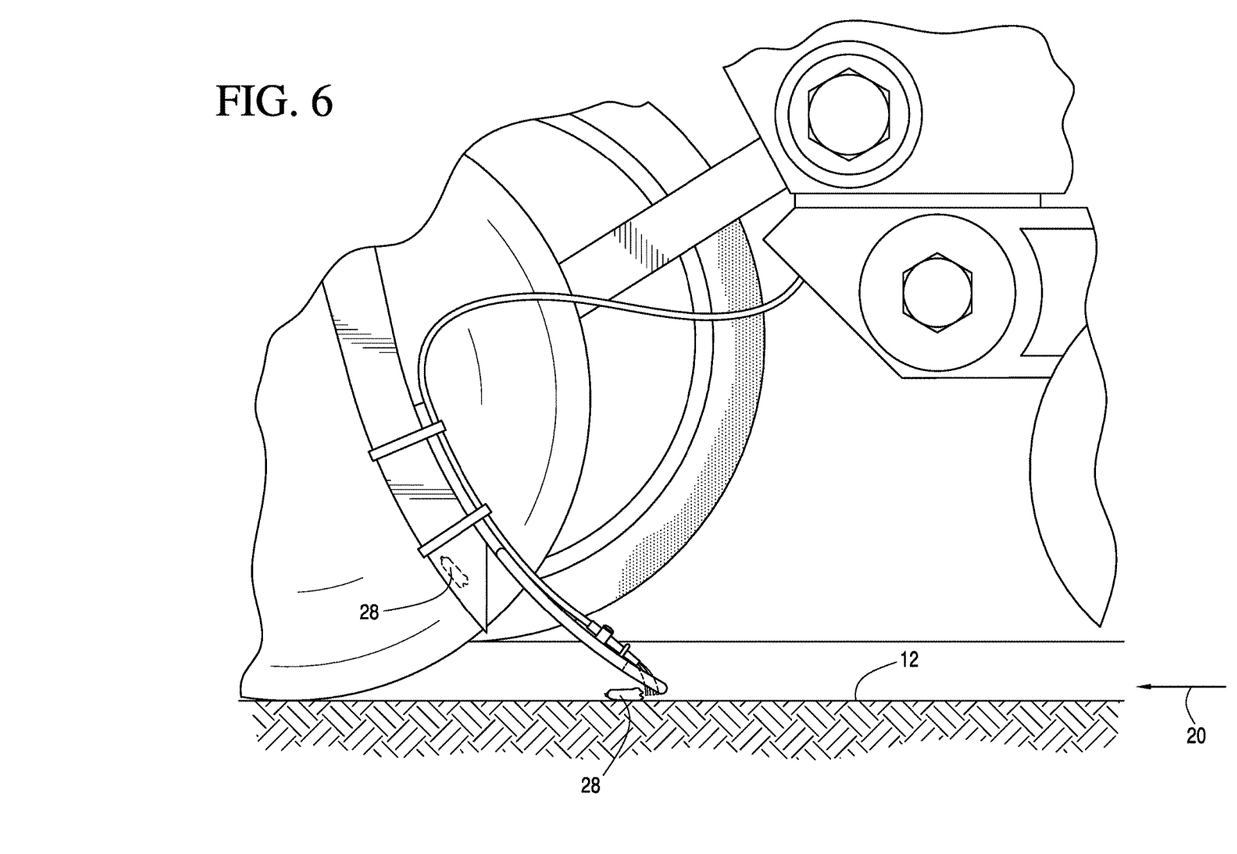
Figure 7:
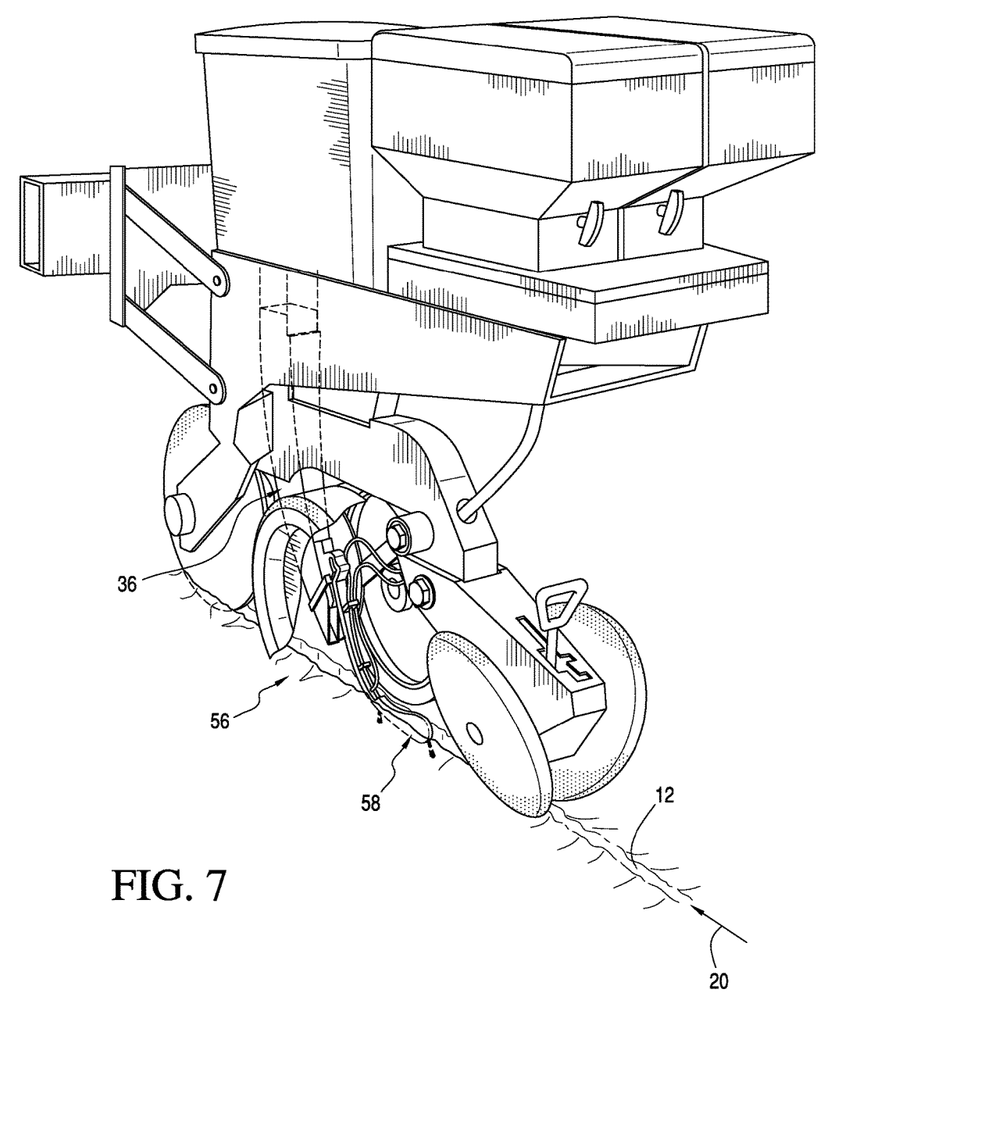
Figure 8:
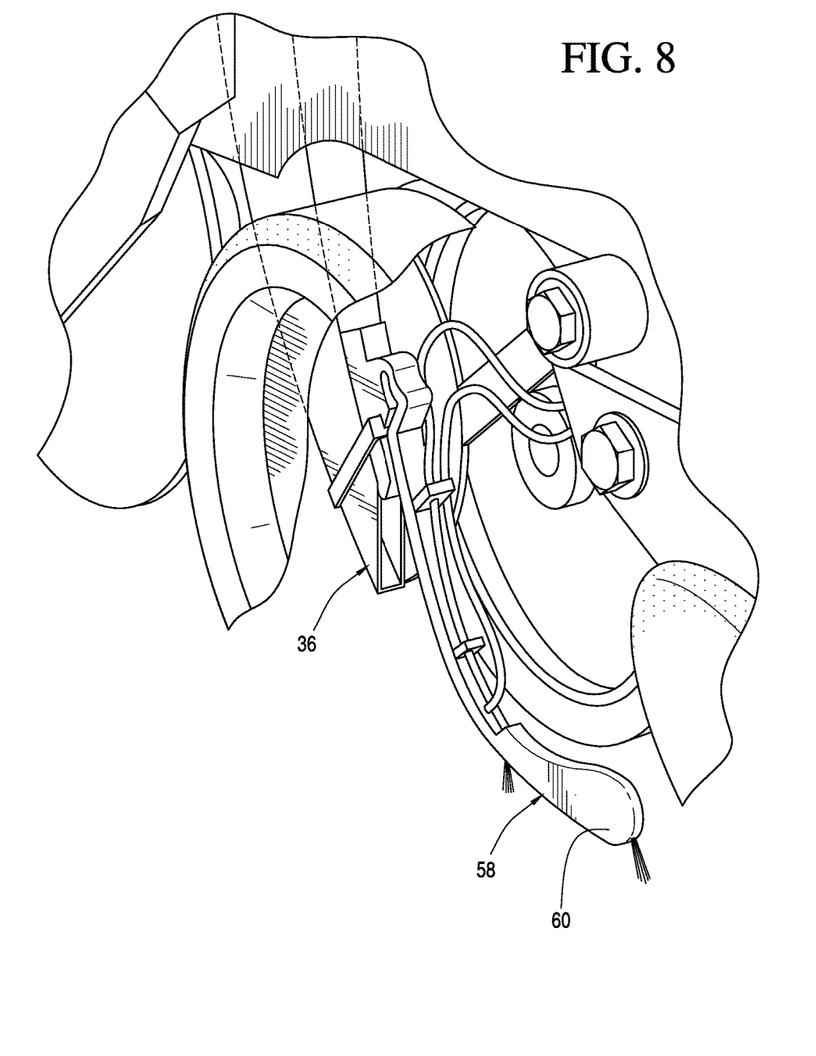
Figure 9:
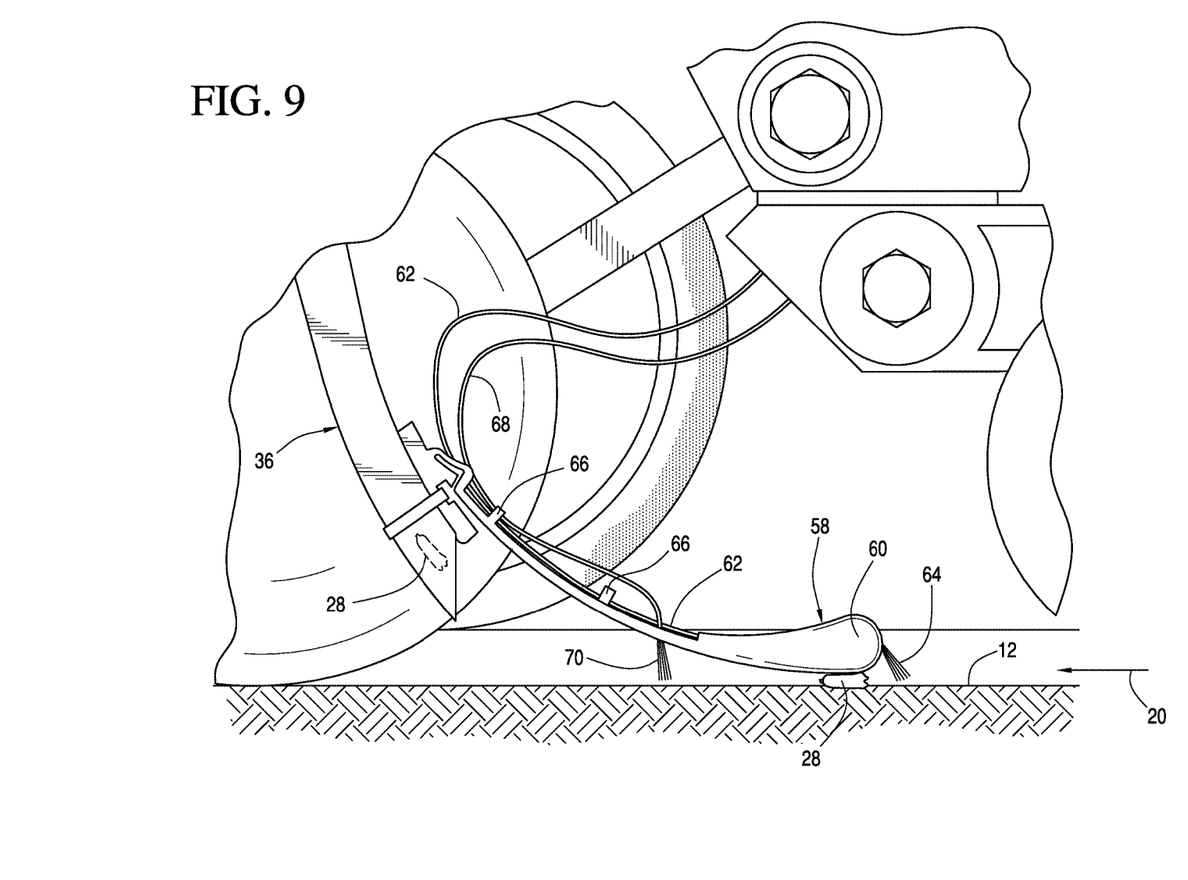

Referring now to FIGS. 7-9 another embodiment is illustrated, designated generally as 56. In this embodiment, instead of a seed cover assembly, a seed firmer assembly 58 is used in the apparatus 56 for minimizing the volume of a liquid carrier used for delivering an agricultural product onto a seed in the furrow during planting.

The seed firmer assembly 58 is operatively connected to a seed tube assembly 36. The distal end 60 of the seed firmer assembly 58 serves to force the seed 28 into the bottom of the furrow 12. A seed firmer application tube assembly 62 is mounted to the seed firmer assembly 58. The seed firmer application tube assembly 62 has an outlet end for dispensing the carrier and the agricultural product. A seed firmer brush 64 is mounted to the outlet end of the seed firmer application tube 62. The seed firmer brush 64 is configured to contact the carrier and the agricultural product during the dispensing thereof and brushing the carrier containing the agricultural product onto the seed 28 being dispensed from the seed tube assembly 36. As in the previous embodiment, suitable clamps 66 can be used to hold the seed firmer application tube 62 in place. The seed firmer brush extends from an opening in the distal end 60 of the seed firmer assembly 58. The seed firmer brush may be as described above relative to the seed cover brush.

If more than one liquid agricultural product is desired to be applied, additional seed firmer application tube assemblies 68 and associated seed firmer brushes 70 mounted thereon can be used. This could be in the instance where there are incompatible products thus allowing independent application. One example of such independent application would be the use of both biological and a chemical agricultural product.

As mentioned above, other embodiments and configurations may be devised without departing from the spirit of the invention and the scope of the appended claims.

The invention claimed is:

1. A method for minimizing the volume of a liquid carrier used for delivering an agricultural product into a furrow during planting, comprising:
   a) mounting a spray nozzle on a planter row unit having a closing wheel assembly, said spray nozzle having a pattern width thereof, wherein said spray nozzle is mounted on the planter row unit so as to dispense the carrier containing the agricultural product along a dispensing pattern in alignment with the pattern width, in the direction of a furrow; and, b) operating said planter row unit to deliver the liquid carrier containing the agricultural product in a pulsed rate to provide a substantially continuous line of agricultural product in the furrow.

2. The method of claim 1 wherein said spray nozzle comprises a flat spray tip.

3. The method of claim 1 wherein said pulsed rate is in a range of 3 to 20 times per second.

4. The method of claim 3 wherein said dispensing pattern comprises a strip generally in a range of between 6 and 10 inches.

* * * * *